United States Patent Office 3,497,488
Patented Feb. 24, 1970

3,497,488
UNSATURATED HYDROCARBONS POLYMERIZATION CATALYSTS CONTAINING TRANSITION METAL COMPLEXES AND BRØNSTED ACIDS
François Dawans, Brussels, Belgium, and Philippe Teyssie, Le Vesinet, Yvelines, France, assignors to Institut Francais du Petrole, des Carburants et Lubrifiants, Rueil-Malmaison, France
No Drawing. Filed June 17, 1966, Ser. No. 558,244
Claims priority, application France, June 17, 1965, 21,306
Int. Cl. C08d 1/32
U.S. Cl. 260—94.3      22 Claims

ABSTRACT OF THE DISCLOSURE

Catalysts compositions and methods for polymerizing conjugated diolefins comprising
(a) A complex of a transition metal of Groups IV through VIII of Mendeleev's Periodic Table as a nuclear atom and unsaturated hydrocarbon having at least one pair of $\pi$ electrons as ligand, and
(b) A Brønsted acid.
Preferred embodiments include a catalyst resulting from a pre-treatment of (a) with a conjugated diolefin and the polymerization process incorporating the pre-treated catalyst.

---

This invention relates to a novel catalytic composition which is suitable for the polymerization of unsaturated polymerizable compounds into stereoregular high molecular weight polymers having, for example, an intrinsic viscosity, as measured in benzene at 30° C., higher than 0.1. These catalysts are particularly applicable to the production of 1,4-stereoregular polymers of conjugated diolefins.

In the periodical "Angewandte Chemie" 73 (1961), page 33, Wilke has indicated that complexes of transition metals with organic ligands do selectively catalyze the conversion of unsaturated compounds into oligomers. It has also been found that it is sometimes possible to obtain high molecular weight polymers of low stereoregularity if such complexes were employed while utilizing very severe reaction conditions, such as high temperatures and exceptionally long reaction times. In view of such knowledge, it appeared that the utilization of complexes as catalysts was of no practical significance for the polymerization of conjugated diolefins. However, the basis of the present invention is the discovery that such complexes, when employed with a second component, result in catalysts which are indeed very promising.

An object of this invention, therefore, is to provide novel catalytic compositions comprising complexes of transition metals with organic ligands.

Another object is to provide polymerization processes for the production of conjugated diolefins, said processes being based on the novel catalytic compositions of this invention.

Upon further study of the specification and claims, other objects and advantages of the present invention will become apparent.

To attain the objectives of this invention, there is provided a catalyst composition comprising:
(a) A complex of an unsaturated hydrocarbon and a transition metal of Groups IV to VIII (Subgroups A and B) of Mendeleev's Periodic Table; and
(b) A compound having the properties of a Brønsted acid (a proton donor, see Pauling, "Chimie Générale," Dunod (1958), page 455).

This novel catalytic composition thus contains a co-catalyst (b) which is inexpensive, readily available, and easy to use.

According to this invention, the complex of the transition metal is to be understood as a complex containing in general 1–4, preferably 1–2 ligands. These ligands are preferably unsaturated hydrocarbons which contain at least one pair of $\pi$-electrons, for example, mono- and di-ethylenically unsaturated hydrocarbons, aromatic hydrocarbons, and allyl hydrocarbons. Such hydrocarbon ligands can be employed with or without other ligands which can contain carbon oxides or quinones. These complexes are also considered to be coordination compounds, see "International Encyclopedia of Chemical Science," Van Nostrand (1964), pp. 602–606.

The preferred group of ligands consists of cyclopolyolefins, principally those containing 5–18 carbon atoms per molecule and having a nucleus of 5–14 carbon atoms. Such cyclopolyolefins contain 2–6, preferably 2–4 double bonds per molecule. Catalysts composed of these ligands are both highly active and particularly selective.

Among the complexes of transition metals which can be employed in this invention, the most preferred is bis-(1,5-cyclooctadiene) nickel; however, the following complexes also yield excellent results:

bis-(cyclopentadiene) nickel
bis-(cyclopentadiene) cobalt
cyclooctateraene nickel
1,5,9-centro (trans, trans, trans cyclododecatriene) complexes
dibenzene chromium
bis-($\pi$-allyl) nickel
$\pi$-allyl-cyclopentadienyl nickel
tris-($\pi$-allyl) chromium
tris(trans-stilbene) nickel
bis-(hexamethyl-benzene) chromium
dibenzene vanadium
dibenzene molybdenum
cyclopentadiene benzene molybdenum
1,3-cyclohexadiene, cyclopentadiene palladium
1,3-cyclohexadiene, benzene ruthenium
cyclohexadiene nickel
bis-(3,7-dimethyl-1,5-cyclooctadiene) nickel
bis-(3-phenyl-1,5-cyclooctadiene) nickel Still further examples of usable complexes are:
1,5-cyclooctadiene-duroquinone nickel
cyclooctatetraene-duroquinone nickel
cyclopentadiene vanadium tetracarbonyl
benzene molybdenum tricarbonyl
cyclopentadienyl dicarbonyl cobalt
cycloheptatriene tricarbonyl chromium
1,5-cyclooctadiene tetracarbonyl chromium
dicyclohexadiene-1,3-dicarbonyl molybdenum
5,6-dimethylene bicyclo-2,2,1-heptene-2-tricarbonyl molybdenum These various complexes are generally soluble in hydrocarbons in a proportion of at least 0.01% by weight.

As specific examples of the compounds exhibiting Brønsted acid properties, there are included:
Mineral acids, such as hydrofluoric acid, hydrochloric acid, sulfuric acid, peroxy(mono)sulfuric acid, nitric acid, phosphoric acid, hydriodic acid, and hydrobromic acid.
Organic acids, such as acetic acid, formic acid, isobutyric acid, monochloroacetic acid, dichloroacetic acid, trichloroacetic acid, trifluoroacetic acid, as well as other carboxylic acids in general, and furthermore benzenesulfonic acid, paratoluenesulfonic acid, $\alpha$-naphthalenesulfonic acid, as well as other sulfonic acids, and still further picric acid and sulfinic acids, etc.

For further specific examples, reference is directed to tables of acids which are listed in "Handbook of Chemistry and Physics," latest edition, Lang's "Handbook of Chemistry," latest edition, Kirk-Othmer "Encyclopedia of Chemical Technology," Second Edition, volume 1, pages 226, 229–231–232, 234–235–236, 238–239–240 in particular. The disclosure of acids in such reference works is to be considered as incorporated in this disclosure.

Of the Brønsted acids, it is preferred to employ strong acids which exhibit a dissociation constant of higher than $10^{-4}$ at 25° C. With such acids, the resultant catalyst substantially increases the reaction velocity of the polymerization.

The ratio of compound (a) to compound (b) can vary greatly; for example, it is possible to utilize 0.01–50 mols of compound (a) to 1 mol of compound (b). Though all of these ratios will result in a finite catalytic activity, it is to be emphasized that certain ratios give better results than others. For example, to obtain a high degree of conversion of the monomer to a polymer having a high molecular weight and stereoregularity, as well as being soluble in hydrocarbons, it is prefered to employ a ratio of 0.1–3 mols of compound (a) to 1 mol of compound (b).

Particularly preferred combinations of (a) and (b) are as follows:

| Combination No. | Complex (a) | Acid (b) |
| --- | --- | --- |
| (1) | $(C_5H_5)_2Ni$ | HCl |
| (2) | $(C_5H_5)_2Ni$ | $CF_3COOH$ |
| (3) | $(C_8H_{12})_2Ni$ | HCl |
| (4) | $(C_8H_{12})_2Ni$ | HBr |
| (5) | $(C_8H_{12})_2Ni$ | HI |
| (6) | $(C_8H_{12})_2Ni$ | $H_2S_2O_7$ |
| (7) | $(C_8H_{12})_2Ni$ | $CCl_3COOH$ |
| (8) | $(C_8H_{12})_2Ni$ | $CF_3COOH$ |
| (9) | $(C_8H_{12})_2Ni$ | $CH_3SO_3H$ |
| (10) | $(C_8H_{12})_2Ni$ | $CH_3C_6H_4SO_3H$ |
| (11) | $(C_8H_{12})_2Ni$ | $(NO_2)_3C_6H_2OH$ |
| (12) | $(C_8H_{12})_2Ni$ | $CCl_3COOH/SnCl_4$ |
| (13) | $(C_8H_8)Ni$ | HCl |
| (14) | $(C_8H_8)Ni$ | $CF_3COOH$ |
| (15) | $(C_6H_8)_2Ni$ | HCl |
| (16) | $(C_6H_8)_2Ni$ | $CF_3COOH$ |
| (17) | $(C_{12}H_{18})Ni$ | HCl |
| (18) | $(C_{12}H_{18})Ni$ | HBr |
| (19) | $(C_{12}H_{18})Ni$ | $CF_3COOH$ |
| (20) | $(C_{12}H_{18})Ni$ | $CCl_3ClOH$ |
| (21) | $(C_{12}H_{18})Ni$ | $(NO_2)_3C_6H_2OH$ |
| (22) | $(C_{12}H_{18})Ni$ | $CCl_3COOH/SnCl_4$ |

The activity of the catalysts can be increased even further by adding other components which are capable of forming a complex with the acid while increasing its acidity. Such additives are metal halides, for example, $BF_3$, $SnCl_4$, $SbCl_5$.

The amount of catalyst that is employed for the polymerization reation is dependent on the desired reaction velocity and also the molecular weight of the final polymer. As in other polymerization reactions, the higher the content of the catalyst, the more rapid the polymerization, but the lower the molecular weight of the polymer. Consequently, a catalytic quantity of the catalyst is added which is dependent upon the desired results. In general, there are employed at least 0.001 atoms of metal (in the form of the complex), preferably 0.1–2 atoms of metal per 100 mols of monomer. The latter preferred proportions lead to polymers having the maximum stereoregularity.

The polymerization reaction is conducted with or without a solvent, at a temperature generally between —40 and +120° C., preferably a range of about 20–75° C. which leads to polymers of excellent stereoregularity.

As for the pressure to be employed for the polymerization reaction, the only criterion is that a pressure must be selected so that the monomer is in the liquid phase at the polymerization that is employed, the higher the pressure that is necessary.

As for the addition of compounds (a) and (b), it is preferred to mix them only in the presence of the monomer in order to avoid side reactions. In this connection, a preferred embodiment of this invention embraces the utilization of a pretreatment for compound (a) of the catalyst before it is mixed with compound (b).

The pretreatment comprises mixing component (a) with some monomer, preferably in the presence of an inert solvent, such as a paraffinic or aromatic hydrocarbon. It is advantageous, in this connection, to use at least 0.5 mol of monomer, more preferably 3–30 mols of monomer, per metal atom in the form of the complex. Component (a) is maintained in contact with a monomer at a convenient temperature, for example, between —20 and +100° C., preferably between 0 and 60° C. for a residence time generally higher than 1 minute, for example, 10 minutes to 24 hours. During the course of this contact, or preferably following same, it is advantageous to evaporate at least a part of the hydrocarbon which was initially present in the form of the complex. During this evaporation, uncombined monomer, as well as any solvent initially present can also be removed in whole or in part. The resultant undistilled product constitutes pretreated component (a) of the catalyst.

Catalysts comprising pretreated component (a) and component (b) are generally more active than the same catalysts which are based on unpretreated component (a).

The most preferred method for conducting polymerization comprises reacting the pretreated component (a) with the Brønsted acid in the absence of monomer. Following this reaction, unreacted excess acid is removed, for example by evaporation and distillation; and this product is then added to the monomer which is to be polymerized. By this treatment, the excess free acid is advantageously eliminated, thereby avoiding side reactions during polymerization, and also reducing the corrosiveness of the reaction milieu, which can result in considerable savings with respect to the selection of materials of construction.

The novel catalyst composition of this invention is useful for the polymerization of generally all unsaturated polymerizable compounds and mixtures thereof. It has been found, moreover, that the catalyst composition is particularly applicable to the polymerization of ethylenically unsaturated hydrocarbons containing up to 20 carbon atoms, for example, isoprene and styrene. Excellent results are obtained when the monomer is a conjugated diolefin containing 4–7 carbon atoms, particularly butadiene.

The catalyst composition is also good for the polymerization of mono-olefins to yield high molecular weight polymers, particularly from ethylene.

As solvents for the polymerization reaction, it is advantageous to select inert hydrocarbons, in particular, aromatic, paraffinic, or cycloparaffinic hydrocarbons, or their halogenated derivatives, particularly the chlorinated derivatives. When non-polar hydrocarbons are employed as solvents, the polymerization reaction is stereospecific to the cis-1,4-form whereas polar solvents lead to the formation of the trans-1,4-form.

Particularly preferred solvents for this invention are pentane, hexane, heptane, octane, isoheptane, isooctane, benzene, toluene, xylene, cyclohexane, and methylcyclohexane.

If, as component (a), a complex is selected which is decomposed by water, it is then preferred to operate in an anhydrous reaction medium, or one which contains only slight traces of water.

Aside from the previously mentioned catalytic components, it is also possible to add various polymerization additives which are compatible with components (a) and (b), which additives are conventionally employed regulators, for example.

The polymerization reaction can be conducted under autogenous pressure or under any total pressure sufficient to maintain the reaction mixture substantially in the liquid phase. The pressure is a function of both the particular diluent employed, and also the polymerization temperature. If highly elevated pressures are employed, any appropriate technique can be used, such as the utilization of a high pressure gas which is inert under the conditions of the polymerization reaction.

Any conventional technique can be employed for conducting the polymerization reaction, such as a continuous polymerization, semicontinuous polymerization in serially connected polymerization reactors, or entirely in one batch in a reactor. Inasmuch as certain impurities, when present in uncontrolled amounts, can deleteriously affect the activity of the catalyst of the present invention, it is important to take the necessary precautions to eliminate such impurities from the reactants. Such impurities include, for example, carbon dioxide and oxygen. The usual conventional purging methods are employed to eliminate these impurities, so that the reaction can take place without their presence. Thus, the diluent is so treated, and the polymerization reactor is purged with an inert gas.

When the polymerization is terminated, any one of many working-up procedures can be employed to inactivate the catalyst and recover the final product. For example, in one process the polymer is recovered by entraining the same in diluent vapor. In another process, an inactivator is added to the catalyst, and the polymer is precipitated. The polymer is then separated from the precipitate and the diluent by any appropriate step, such as decantation or filtration. On the other hand, it is often preferred to add only that amount of inactivator which can inactivate the catalyst without simulaneously precipitating the polymer, and in this way it is possible to add to the polymer solution any one of various additives which are usually found in final polymer products.

As polymer additives, it is advantageous to add an anti-oxidant, such as $\beta$-phenyl-napthylamine or para-tert.-butyl cresol. After the addition of such an antioxidant to the catalyst solution, the polymer can be precipitated by the addition of a precipitant, such as ethyl os isopropyl alcohol. In this connection, it is often advantageous to add to the alcohol a complexing or chelating agent which can extract the metal of the catalyst from the polymer, thereby leaving the metal in solution after the polymer is precipitated. Such complexing or chelating agents include acetylacetone and the disodium salt of ethylenediamine-tetracetic acid.

It is further to be understood that other methods can be employed to recover the polymer from the reaction solution. After the polymer is separated from the alcohol and diluent by filtration or any other conventional separating process, the polymer is thereupon dried.

The finally obtained polymers produced by the present invention are generally normally solid, but at the same time, by manipulation of the reaction times, temperatures, and quantities of catalyst, it is possible to obtain polymers which range from lower molecular weight liquids to very high molecular weight solids.

With respect to the polybutadienes which are obtained by this invention, the microstructure thereof has been determined by infrared spectroscopy according to the method of D. Morero, A. Santambrogio, L. Porri, and F. Ciampelli ("La Chimica et l'Industria" [Chemistry and Industry], XLI, 8, 1959).

The structure of the polymers obtained by this invention can also be varied by the selection of specific species of components (a) and (b), and/or varying the relative proportions thereof. For example, by the utilization of trifluoroacetic acid as component (b), the resutant catalyst directs the polymerization stereospecifically to the production of polymers having a very high cis-1,4-content, as compared for example, to polymers obtained by the use of other halogenated organic acids. With respect to chlorinated inorganic acids, it is to be noted the hydrochloric acid yields polymers which are essentially cis-1,4, whereas the use of hydriodic acid leads to polymers which are essentialy trans-1,4.

In summation, this invention not only is advantageous because component (b) is a readily available, inexpensive, easily handleable substance, but also the catalyst as a whole can be tailor-made to the production of polymers having the desired geometrical configurations, with the concomitant properties associated therewith.

Without further elaboration, it is believed that one skilled in the art can, using the preceding description, utilize the present invention to its fullest extent. The following preferred specific embodiments are, therefore, to be construed as merely illustrative, and not limitative of the remainder of the specificaion and claims in any way whatsoever.

EXAMPLE 1A

Under an inert atmosphere, there are mixed 8 cc. of butadiene -1,3 in the liquid phase, 6 cc. of a solution of 0.12 mol per liter of bis-(cyclooctadiene) nickel of the formula $(C_8H_{12})_2$ Ni(o) in toluene, and 1 cc. of a toluenic solution of 0.27 mol per liter of anyhydrous hydrochloric acid. The molar ratio of the nickel compound to the hydrochloric acid is 2.6. The reaction mixture is then agitated for 20 hours at 55° C.

The resultant reaction mixture is treated with aqueous methyl alcohol containing an anti-oxidant, for example, N-phenyl-$\beta$-napthylamine, and a complexing agent for nickel, for example, acetylacetone. The precipitated polymer is purified by dissolving the same in benzene, followed by filtration and re-precipitation by methyl alcohol. There is thus obtained an elastomeric polybuadiene containing 84% cis-1,4-units, 13% trans-1,4-units, and 3% vinyl units, the conversion from the monomer into the polymer being 20%.

EXAMPLE 1B

For purposes of comparison, Example 1A is repeated without utilizing component (b), the hydrochloric acid. In this case, there is obtained, other than the oligomers, some polybutadiene powder containing more than 85% trans-1,4-units. The over-all yield with respect to polybutadiene is only about 1.5%.

EXAMPLE 1C

For purposes of comparison, Example 1A is repeated, but this time without employing component (a), the bis-(cyclooctadiene) nickel. In this case, there is no observed formation of any polymer.

EXAMPLE 2

Under an inert atmosphere, there are added 6 cc. of a solution of 0.1 mol per liter of bis(cyclooctadiene) nickel(o) to a solution of 8 cc. of butadiene in 10 cc. of toluene. 5 cc. of a solution of 0.1 mol per liter of anhydrous sulfuric acid are added to the reaction mixture. The molar ratio of the nickel complex to the sulfuric acid is 1.2.

The reaction mixture is agitated at 55° C. for 20 hours, thereby obtaining a 60% conversion into polybutadiene having an intrinsic viscosity of about 0.7. The finally obtained polymer is 80% cis-1,4, 18% trans-1,4, the remainder being vinyl bonds.

EXAMPLE 3

Example 2 is repeated, except for a reduction in the quantity of sulfuric acid from 5 cc. to 1 cc., thereby increasing the molar ratio of 1.2 to 6.1. In this case, a polymer is obtained with a conversion of 31%, the resultant polymer being 31% cis-1,4, 65% trans-1,4, and 4% vinyl bonds.

EXAMPLE 4

To a solution of 8 cc. butadiene in 7 cc. of toluene, there are added 6 cc. of a solution of 0.11 mol per liter of bis-(cyclooctadiene) nickel(o) in toluene and 3 cc. of a solution of 0.1 mol per liter of picric acid in toluene. By operating under the same experimental conditions as described in the preceding examples, there is thus obtained about 3% of polybutadiene containing more than 90% cis-1,4-units.

EXAMPLE 5

There are added 6 cc. of a solution of 0.11 mol per liter of bis-(cyclooctadiene) nickel to a solution of 8 cc. of butadiene in 9 cc. of toluene. To this mixture, there are added 6 cc. of a solution of 0.1 mol per liter of trichloroacetic acid in toluene which results in a molar ratio of the complex to the acid of 1.1. After agitating this reaction mixture at 55° C. for 20 hours, there is thus obtained, at a conversion of 36%, polybutadiene containing 90% cis-1,4-units, 8% trans-1,4-units, the remainder being vinyl bonds.

EXAMPLE 6

Example 5 is repeated, except that trichloracetic acid is replaced by trifluoroacetic acid, all other things being equal. The conversion is increased to 70%, the microstructure remaining predominantly cis-1,4.

EXAMPLE 7

To a solution of 8 cc. of butadiene in 9 cc. of toluene, there are added 6 cc. of a solution of 0.1 mol per liter of bis-(cyclooctadiene) nickel and 5 cc. of a solution of 0.1 mol per liter of paratoluenesulfonic acid. After the reaction mixture is agitated for 20 hours at 55° C., there is thus obtained a 37% conversion of a polymer having an intrinsic viscosity of about 0.2, the microstructure of which is essentially about 50% 1,4-cis and 50% 1,4-trans.

bis-(cyclooctadiene) nickel(o), an anhydrous acid, and an organic solvent are agitated at 55° C. The polymer is recovered as indicated in Example 1, and its intrinsic viscosity η is measured at 30° C. in benzene. The specific operating conditions and results are found in the following Table I.

TABLE I

| Example | Acid | Solvent | Monomer | Ni millimols | Acid millimols | Reaction time, hours | Conversion, percent | Microstructure, percent | | | $[\eta]$ 30° C. $C_6H_6$ |
|---|---|---|---|---|---|---|---|---|---|---|---|
| | | | | | | | | Cis 1,4 | Trans 1,4 | Vinyl | |
| 8 | Trichloroacetic | 20 cc. toluene | 5.2 g. butadiene | 1 | 1 | 15 | 27.2 | 80.7 | 16.6 | 2.7 | 0.24 |
| 9 | Hydriodic | 16 cc. cyclohexane +toluene | 5 g. butadiene | 0.66 | 0.6 | 20 | 64.5 | 0 | [1]100 | 0 | |
| 10 | do | do | do | 0.66 | 1.2 | 20 | 57.4 | 0 | [1]100 | 0 | |
| 11 | do | do | do | 0.66 | 0.15 | 20 | 49.9 | 0 | [1]100 | 0 | |
| 12 | do | 19 cc. cyclohexane toluene | 5.2 g. butadiene | 0.96 | 0.96 | 6 | 30.4 | 0 | [1]100 | 0 | |
| 13 | Trichloroacetic | 10 cc. toluene | 3.4 g. isoprene | 0.5 | 1 | 48 | 22.5 | 35 | [2]55 | 10 | |
| 14 | do | do | do | 0.5 | 0.5 | 48 | 6.3 | 35 | [2]55 | 10 | |
| 15 | do | do | do | 0.5 | 0.5 | 48 | 5.7 | 35 | [2]55 | 10 | |
| 16 | do | do | 5 g. styrene | 0.5 | 0.5 | 48 | 8.5 | | | | |

[1] The infrared spectrum indicates two absorptions at 770 and 1050 cm⁻¹, characteristic of crystallinity. This observation, moreover, has been confirmed by X-ray crystallography.
[2] The percentages of 1,4-units were estimated by nuclear magnetic resonance. However, these analyses indicate a 10% deficiency in ethylenic protons. The percentages of the vinyl bonds were determined by infrared spectrometry.

EXAMPLES 17 TO 29

These examples illustrate the preferred embodiment of this invention wherein the complex of the transition metal, component (a), is subjected to a pretreatment. Under an inert atmosphere, there are mixed 8 cc. of butadiene-1,3 in the liquid phase, that is 5.2 g., with 2.2 g. of bis-(cyclooctadiene) nickel of the formula $(C_8H_{12})_2$ Ni and 20 cc. of heptane. This mixture is agitated at 20° C. for about 1 hour. After evaporation under vacuum (0.2 mm. Hg) at 20° C. for 1 hour, there is thus obtained a red oil which is then taken up in a solution of heptane. The resultant solution is titrated to determine the concentration of nickel, and it is found to have 3.9 g. of nickel per liter. To 6 cc. of this solution, there are added 8 cc. of liquid butadiene-1,3, and then the remainder of the solvent and anhydrous acid.

The polymerization commences and is continued at 55° C. under agitation. (Example 27 is conducted at a polymerization temperature of 25° C.) The reaction time is varied according to the following Table II. The polymer is then worked up and recovered as in Example 1.

The specific operating conditions and results of the process are set forth in the following Table II.

TABLE II

| Example | Acid | Solvent | Ni, millimols | Acid, millimols | Reaction time, hours | Conversion, percent | Microstructure, percent | | | $[\eta]$ 30° C. $C_6H$ |
|---|---|---|---|---|---|---|---|---|---|---|
| | | | | | | | Cis 1,4 | Trans 1,4 | Vinyl | |
| 17 | Trichloroacetic | 20 cc. heptane | 0.4 | 0.4 | 3 | 26 | 90.5 | 6.6 | 2.9 | 0.69 |
| 18 | do | do | 0.4 | 0.8 | 3 | 8.4 | 90.9 | 6 | 3.1 | |
| 19 | do | do | 0.4 | 1.6 | 3 | 0.3 | 83 | 12.2 | 4.8 | |
| 20 | do | do | 0.4 | 0.2 | 3 | 3.3 | 79.5 | 18 | 2.5 | |
| 20A | Without acid | do | 0.4 | | 3 | 0 | | | | |
| 21 | Trifluoroacetic | do | 0.4 | 0.4 | 3 | 89.5 | 90.8 | 4.5 | 4.7 | 0.57 |
| 22 | Picric | 20 cc. heptane+ toluene | 0.4 | 0.4 | 3 | 8.3 | 87 | 9.6 | 3.4 | 0.82 |
| 23 | do | do | 0.4 | 0.53 | 3 | 14.2 | 92.5 | 4.6 | 2.9 | 0.545 |
| 24 | do | do | 0.4 | 0.8 | 3 | 46.4 | 92.6 | 4.7 | 2.7 | |
| 25 | Methanesulfonic | 20 cc. heptane | 0.4 | 0.4 | 15 | 32.7 | 43.5 | 51.2 | 5.3 | |
| 26 | do | do | 0.4 | 1.6 | 15 | 16.4 | 51 | 44.2 | 4.8 | |
| 27 | do | do | 0.4 | 1.6 | 17 | 22.3 | 40.8 | 57.9 | 1.3 | |
| 28 | Hydrochloric | do | 0.4 | 0.8 | 3 | 12.7 | 83.8 | 13.3 | 2.9 | 0.24 |
| 29 | Trichloroacetic | 20 cc. $CH_2Cl_2$ | 0.4 | 0.4 | 3 | 11.5 | 55.3 | 43 | 1.7 | 0.225 |

EXAMPLES 8 TO 16

The same operating conditions employed in Example 1 are used. In each instance, a polymerizable monomer,

EXAMPLE 30

Using the same reaction conditions as in Examples 17 to 29, there is added as the cocatalyst (b) a mixture of trichloroacetic acid and tin tetrachloride, so as to have a resultant molar ratio of nickel:trichloroacetic acid of about 1. After a reaction time of 30 minutes, there is obtained a 33% conversion into polybutadiene when component (b) has a molar ratio of trichloroacetic acid to tin tetrachloride of about 1; and correspondingly, a conversion of 25.4% when the molar ratio is 2.

The microstructure of the resultant polybutadiene is 86% cis-1,4, 12% trans-1,4, and 2% vinyl.

EXAMPLE 31

Using the same reaction conditions as Example 28, there is reacted at ambient temperature hydrochloric acid with the reaction product of bis-(cyclooctadiene) nickel with butadiene. The excess acid is liberated by evaporation under vacuum. To the resultant evaporated residue there is added the quantity of butadiene necessary for polymerization.

Under these conditions, there is obtained with a conversion rate of 13.5%, comparable to that of Example 28, polybutadiene having a microstructure of 90.5% cis-1,4, 7.7% trans-1,4, and 1.8% vinyl. The intrinsic viscosity of the polymer is 0.83.

EXAMPLE 32

Under an inert atmosphere, there is mixed 4 cc. of butadiene with 2.9 cc. of a solution of cyclododecatriene nickel in heptane (0.25 millimol of nickel complex), 10.6 cc. of heptane, and 0.94 cc. of a solution of 0.534 mol per liter of trichloroacetic acid in heptane. After a reaction time of 1½ hours at 45° C. under agitation, there is obtained 1.36 g. of polybutadiene (conversion: 52.3%) having a microstructure of 93.2% cis-1,4, 3.8% trans-1,4, and 3% vinyl. The intrinsic viscosity of the polymer is 0.57 as measured in benzene at 30° C.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A catalyst composition consisting essentially of the reaction product of
   (a) a non-ionic coordination complex of a transition metal of Groups IV through VIII of Mendeleev's Periodic Table as the nuclear atom, and unsaturated hydrocarbon as ligand, said hydrocarbon having at least one pair of $\pi$ electrons; and
   (b) a Brønsted acid, the molar of (a) to (b) being 0.1:1 to 3:1 respectively.

2. A catalyst composition as defined by claim 1 wherein said unsaturated hydrocarbon is a cyclopolyolefin having about 5–1 carbon atoms per molecule, a nucleus of about 5–14 carbon atoms and about 2–6 double bonds per molecule.

3. A catalyst composition as defined by claim 2 wherein the coordination compound is bis-(1,5-cyclooctadiene) nickel.

4. A catalyst composition as defined by claim 1 wherein the Brønsted acid has a dissociation constant higher than $10^{-4}$.

5. A catalyst composition as defined by claim 1 wherein the Brønsted acid is trifluoroacetic acid.

6. A catalyst composition as defined by claim 1 wherein the Brønsted acid is hydrochloric acid.

7. A catalyst composition as defined by claim 1 wherein the Brønsted acid is hydriodic acid.

8. A catalyst composition as defined by claim 1, further comprising a Lewis acid.

9. A catalyst composition as defined by claim 1 wherein the coordination compound is subjected to a pretreatment comprising reacting said coordination compound with a polymerizable monomer, the resultant reaction product being then reacted with the Brønsted acid.

10. A catalyst composition as defined by claim 9 wherein said polymerizable monomer is butadiene.

11. A catalyst composition as defined by claim 9 wherein at least a portion of hydrocarbon ligand of the coordination compound is separated by distillation after the reaction of the coordination compound with the polymerizable monomer.

12. A catalyst composition as defined by claim 9 wherein at least 0.5 mol of polymerizable monomer is employed per atom of transition metal in the form of the coordination compound.

13. A catalyst composition as defined by claim 9 wherein the addition of said reaction product to the Brønsted acid is conducted in the absence of unreacted polymerizable monomer, and excess Brønsted acid is separated from the resultant product.

14. A process for the polymerization of a conjugated diolefinic hydrocarbon, which process comprises polymerizing said hydrocarbon in a substantially anhydrous medium and in the presence of a catalyst composition as defined by claim 20.

15. A process for the polymerization of a conjugated diolefinic hydrocarbon, which process comprises polymerizing said hydrocarbon in a substantially anhydrous medium and in the presence of a catalyst composition as defined by claim 5.

16. A process for the polymerization of a conjugated diolefinic hydrocarbon, which process comprises polymerizing said hydrocarbon in a substantially anhydrous medium and in the presence of a catalyst composition as defined by claim 13.

17. A process for the polymerization of butadiene which process comprises polymerizing butadiene in the liquid phase in contact with a catalyst comprising bis-(1,5-cyclooctadiene) nickel and an acid selected from the group consisting of trifluoroacetic acid, hydrochloric acid, and hydriodic acid, the molar ratio of the bis-(1,5-cyclooctadiene) nickel to the acid being 0.01:1 to 50:1, respectively.

18. A catalyst composition as defined by claim 1, wherein said transition metal is nickel.

19. A catalyst composition as defined by claim 18 wherein the Brønsted acid is trifluoroacetic acid.

20. A catalyst composition according to claim 1, wherein said transition metal is from Groups V through VIII of Mendeleev's Periodic Table.

21. A process for the polymerization of an ethylenically unsaturated hydrocarbon, which process comprises polymerizing said hydrocarbon in the presence of a catalyst composition as defined by claim 18, in a substantially anhydrous medium.

22. A process for the polymerization of an ethylenically unsaturated hydrocarbon, which process comprises polymerizing said hydrocarbon in the presence of a catalyst composition as defined by claim 19, in a substantially anhydrous medium.

References Cited

UNITED STATES PATENTS

| | | | |
|---|---|---|---|
| 3,379,706 | 4/1968 | Wilke | 260—94.3 |
| 3,271,381 | 9/1966 | Anderson et al. | 260—94.9 |
| 3,163,611 | 11/1957 | Anderson et al. | 252—429 |
| 2,965,627 | 12/1960 | Field et al. | 260—94.9 |
| 3,402,163 | 9/1968 | Schleimer et al. | |

JOSEPH L. SCHOFER, Primary Examiner

R. A. GAITHER, Assistant Examiner

U.S. Cl. X.R.

252—431; 260—94.9, 93.5